(12) United States Patent
Mizushima et al.

(10) Patent No.: US 8,785,586 B2
(45) Date of Patent: Jul. 22, 2014

(54) LIQUID SILICONE RUBBER COATING COMPOSITION, CURTAIN AIRBAG, AND ITS PRODUCTION METHOD

(71) Applicant: Shin-Etsu Chemical Co., Ltd., Tokyo (JP)

(72) Inventors: Hidenori Mizushima, Annaka (JP); Tsuneo Kimura, Annaka (JP); Shigeru Ubukata, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 13/654,794

(22) Filed: Oct. 18, 2012

(65) Prior Publication Data

US 2013/0099468 A1    Apr. 25, 2013

(30) Foreign Application Priority Data

Oct. 19, 2011   (JP) ................. 2011-229390

(51) Int. Cl.
```
C08G 77/20      (2006.01)
C08L 83/04      (2006.01)
C08G 77/12      (2006.01)
C08K 3/36       (2006.01)
C08K 5/5399     (2006.01)
B60R 21/232     (2011.01)
C08L 83/00      (2006.01)
```

(52) U.S. Cl.
CPC ............ *C08L 83/04* (2013.01); *C08L 83/00* (2013.01); *C08G 77/12* (2013.01); *C08G 77/20* (2013.01); *C08K 3/36* (2013.01); *C08K 5/5399* (2013.01); *B60R 21/232* (2013.01)
USPC ................. 528/23; 528/31; 528/32; 528/17

(58) Field of Classification Search
CPC ......... C08L 83/04; C08L 83/00; C08G 77/12; C08G 77/20; C08K 3/36; C08K 5/5399; B60R 21/232
USPC .......................... 528/31, 32, 17, 23
See application file for complete search history.

(56) References Cited

U.S. PATENT DOCUMENTS 6,037,279 A * 3/2000 Brookman et al. ............ 442/71
2012/0289110 A1* 11/2012 Blackwood et al. .......... 442/59

FOREIGN PATENT DOCUMENTS

| EP | 0 663 468 A1 | 7/1995 |
|----|--------------|--------|
| EP | 1 076 822 A2 | 2/2001 |
| JP | 3165312 B2 | 5/2001 |
| JP | 2006-82443 A | 3/2006 |
| JP | 2010-53493 A | 3/2010 |

OTHER PUBLICATIONS

Allcock, H.R., "Flame Resistant Materials," H. R. Allcock Research Group, 2006, pp. 1-5, XP002692488, Retrieved from the Internet: URL:http://www.personal.psu.edu/hral/flame_resistant_materials.htm [retrieved on Feb. 20, 2013]; Scheme 1; Figure 1.
Extended European Search Report issued Mar. 20, 2013, in European Patent Application No. 12189186.5.

\* cited by examiner

*Primary Examiner* — Kuo-Liang Peng
(74) *Attorney, Agent, or Firm* — Birch, Stewart, Kolasch & Birch, LLP

(57) ABSTRACT

A liquid silicone rubber coating composition is provided. The composition comprises (A) an organopolysiloxane having at least 2 alkenyl groups bonded to silicon atoms per molecule; (B) an organohydrogenpolysiloxane having at least 2 hydrogen atoms bonded to silicon atoms per molecule; (C) an addition reaction catalyst; (D) a fine powder silica; (E) an organic compound represented by the following general formula (1):

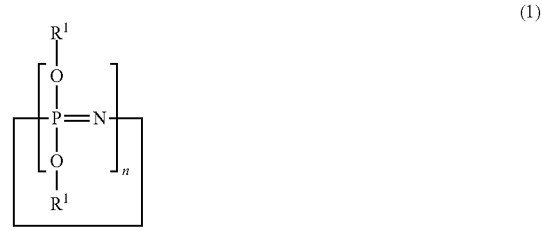

wherein $R^1$ is a monovalent hydrocarbon group and n is an integer of 2 to 10; (F) an organosilicon compound having an epoxy group and an alkoxy group bonded to a silicon atom in the molecule; and (G) either one or both of a titanium compounds and a zirconium compounds. When used for the silicone rubber coating layer on air bag base fabric, excellent low burning speed defined by FMVSS-302 is realized and the cured coating layer exhibits low surface tackiness with high anti-blocking property.

10 Claims, No Drawings

LIQUID SILICONE RUBBER COATING COMPOSITION, CURTAIN AIRBAG, AND ITS PRODUCTION METHOD

CROSS-REFERENCE TO RELATED APPLICATION

This non-provisional application claims priority under 35 U.S.C. §119(a) on Patent Application No. 2011-229390 filed in Japan on Oct. 19, 2011, the entire contents of which are hereby incorporated by reference.

TECHNICAL FIELD

This invention relates to a liquid silicone rubber coating composition adapted for use in producing an airbag installed in a vehicle comprising a fiber cloth of 6,6-nylon, 6-nylon, polyester, or the like having a silicone rubber coating film formed thereon; and in particular, a liquid silicone rubber coating composition adapted for use in producing a curtain airbag which is to be accommodated along the A-pillar to the roof side and which is different from the airbag for the driver or passenger side, and whose inflated state should be maintained for a certain period for the protection of the passenger's head and prevention of the passenger from being thrown out of the vehicle upon collision or roll-over of the vehicle. This invention also relates to a curtain airbag having a silicone rubber coating layer formed by curing such composition as well as its production method.

BACKGROUND ART

Various silicone rubber compositions for airbag have been disclosed for the formation of the rubber film on the fiber surface. For example, JP 3165312 discloses a liquid silicone rubber coating composition for an airbag prepared by adding an inorganic filler and an organopolysiloxane resin to an addition curable composition, and this composition has reduced burning speed defined in FMVSS-302 (Federal Motor Vehicle Safety Standard-302). JP-A 2006-82443 discloses an airbag cloth comprising a substrate cloth and a resin film layer laminated thereon via a silicone rubber coating layer, and this airbag cloth has excellent burning speed defined in FMVSS-302. JP-A 2010-53493 discloses a silicone rubber coating composition for an airbag prepared by adding a silica fine powder reinforcement and aluminum hydroxide to an addition curable composition, and this composition has reduced burning speed defined in FMVSS-302 as well as low surface tackiness.

However, these compositions had a drawback that recent strong demand for the low burning speed and low surface tackiness could not be fulfilled even if these compositions were used for the production of a curtain airbag, and these compositions could not satisfy the such demands.

SUMMARY OF INVENTION

Technical Problem

The present invention has been completed in view of the situation as described above, and an object of the present invention is to provide a liquid silicone rubber coating composition which can be used for the production of a curtain airbag to provide a curtain airbag having low burning speed (as defined in FMVSS-302), and a cured coating layer exhibiting low surface tackiness with high blocking resistance. Another object of the present invention is to provide a curtain airbag comprising a substrate and a silicone rubber coating layer formed by coating and curing such composition on at least one surface of the substrate as well as a method for producing such curtain airbag.

Solution to Problem

In order to achieve such objects, the inventors of the present invention carried out an extensive study and found that when a liquid silicone rubber coating composition comprising (A) an organopolysiloxane having at least 2 alkenyl groups bonded to silicon atoms per molecule, (B) an organohydrogenpolysiloxane having at least 2 hydrogen atoms bonded to silicon atoms per molecule, (C) an addition reaction catalyst, (E) an organic compound forming a phosphazene structural unit represented by the following general formula (1), (F) an organosilicon compound having an epoxy group and an alkoxy group bonded to a silicon atom in the molecule, and (G) at least one member selected from titanium compounds and zirconium compounds, and preferably further comprising (D) a fine powder silica having a specific surface area of at least 50 m$^2$/g is used for the silicone rubber coating layer of a curtain air bag, the coated fabric will exhibit low burning speed (as defined in FMVSS-302) and low surface tackiness (blocking resistance). The present invention has been completed on the basis of such finding.

Accordingly, the present invention provides a liquid silicone rubber coating composition, a curtain airbag, and its production method as described below.

[1] A liquid silicone rubber coating composition comprising
(A) 100 parts by weight of an organopolysiloxane having at least 2 alkenyl groups bonded to silicon atoms per molecule;
(B) an organohydrogenpolysiloxane having at least 2 hydrogen atoms bonded to silicon atoms per molecule, at an amount such that 1 to 10 hydrogen atoms bonded to the silicon atoms in the component (B) are present in relation to one alkenyl group bonded to the silicon atom in the component (A);
(C) an effective amount of an addition reaction catalyst;
(D) 0 to 50 parts by weight of a fine powder silica having a specific surface area of at least 50 m$^2$/g;
(E) 0.1 to 10 parts by weight of an organic compound represented by the following general formula (1):

wherein R$^1$ is independently a substituted or unsubstituted monovalent hydrocarbon group and n is an integer of 2 to 10;
(F) 0.1 to 10 parts by weight of an organosilicon compound having an epoxy group and an alkoxy group bonded to a silicon atom in the molecule; and
(G) 0.1 to 5 parts by weight of at least one member selected from titanium compounds and zirconium compounds.
[2] The liquid silicone rubber coating composition according to the above [1] wherein R$^1$ in the formula (1) of the component (E) is a straight chain, branched, or cyclic alkyl group containing 1 to 20 carbon atoms or a monovalent aromatic hydrocarbon group containing 6 to 40 carbon atoms having 1 to 4 phenyl groups or phenylene skeletons.

[3] The liquid silicone rubber coating composition according to the above [1] or [2] wherein the component (G) is an organotitanium compound.

[4] The liquid silicone rubber coating composition according to the above [3] wherein the organotitanium compound of the component (G) is an organotitatnate, an organotitanium chelate compound, or a combination thereof.

[5] The liquid silicone rubber coating composition according to the above [1] or [2] wherein the component (G) is an organozirconium compound.

[6] The liquid silicone rubber coating composition according to the above [5] wherein the organozirconium compound of the component (G) is an organozirconium ester, an organozirconium chelate compound, or a combination thereof.

[7] The liquid silicone rubber coating composition according to any one of the above [1] to [6] wherein the composition is the one for producing a curtain airbag.

[8] A method for producing a curtain airbag comprising the steps of coating the composition of any one of the above [1] to [6] on at least one surface of a substrate comprising a fiber cloth, and curing the coating composition to form a silicone rubber coating layer composed of the cured product of the coating composition on the at least one surface of the substrate.

[9] A curtain airbag comprising a substrate comprising a fiber fabric and a silicone rubber coating layer formed by coating and curing the coating composition of any one of the above [1] to [6] on at least one surface of the substrate.

Advantageous Effects of Invention

The present invention provides a liquid silicone rubber coating composition which can be used for the silicone rubber coating layer of a curtain airbag to provide a coated fabric curtain airbag having low burning speed (as defined in FMVSS-302), and a cured coating layer exhibiting low surface tackiness with high blocking resistance. When used for the silicone rubber coating layer on air bag base fabric, excellent low burning speed defined by FMVSS-302 is provided and the cured coating layer exhibits low surface tackiness with high anti-blocking property.

DESCRIPTION OF EMBODIMENTS

Next, the present invention is described in further detail. In the present invention, viscosity is the one measured by a rotary viscometer.

<Liquid Silicone Rubber Coating Composition>

The liquid silicone rubber coating composition of the present invention comprises the following components (A) to (G) (with the component (D) being an optional component), and this liquid silicone rubber coating composition is liquid at room temperature (namely, 25° C., and this applies to the following description). Next, each component is described in detail.

[Component (A)]

Component (A) is an organopolysiloxane which has at least 2 alkenyl groups bonded to silicon atoms per molecule, and this component (A) is the base polymer of the coating composition of the present invention. One organopolysiloxane or two or more different types of organopolysiloxanes may be used for the component (A). It is to be noted that the organopolysiloxane of the component (A) does not include the organosilicon compound having epoxy group as described below [Component (F)].

Component (A) may have a molecular structure such as straight chain, cyclic, branched, or three-dimensional network (resin) structure. Component (A) is preferably a straight chain diorganopolysiloxane having a backbone basically comprising a recurrence of diorganosiloxane unit, wherein the backbone is capped at both ends with a triorganosiloxy group. Component (A) is also preferably a three-dimensional network organosiloxane resin basically comprising a monofunctional organosiloxy unit (an $R_3SiO_{1/2}$ unit wherein R is the same as the R in the following formula (2)) and $SiO_2$ unit. When the organopolysiloxane of component (A) has a straight chain or branched molecular structure, the position of the silicon atom having an alkenyl group bonded thereto in the organopolysiloxane molecule may be either or both of the ends of the molecular chain or midst of the molecular chain (not at the end of the molecular chain). Most preferably, component (A) is a straight chain diorganopolysiloxane having an alkenyl group bonded at least to the silicon atom at both ends of the molecular chain.

The alkenyl group bonded to the silicon atom in the component (A) may be independently a substituted or non-substituted alkenyl group each typically containing 2 to 8 carbon atoms, and preferably 2 to 4 carbon atoms. Examples include vinyl group, allyl group, propenyl group, butenyl group, pentenyl group, hexenyl group, cyclohexenyl group, and heptenyl group, and the most preferred is vinyl group.

Content of the alkenyl group bonded to the silicon atom in the component (A) is preferably about 0.001 to 10% by mole, and more preferably about 0.01 to 5% by mole in relation to all of the monovalent organic groups (that is, the substituted or unsubstituted monovalent hydrocarbon group) bonded to the silicon atoms.

Component (A) may also contain a monovalent organic group bonded to the silicon atom other than the alkenyl group bonded to the silicon atom. The monovalent organic group bonded to the silicon atom may be independently a substituted or unsubstituted monovalent organic group containing 1 to 12 carbon atoms, and preferably 1 to 10 carbon atoms, and the monovalent hydrocarbon group may be substituted or unsubstituted with a halogen. Examples of the organic groups include alkyl groups such as methyl group, ethyl group, propyl group, butyl group, pentyl group, hexyl group, cyclohexyl group, and heptyl group; aryl groups such as phenyl group, tolyl group, xylyl group, and naphthyl group; aralkyl groups such as benzyl group and phenethyl group; halogenated alkyl groups such as chloromethyl group, 3-chloropropyl group, and 3,3,3-trifluoropropyl group; and the most preferred are methyl group and phenyl group.

Component (A) may have a viscosity at 25° C. in the range of 100 to 500,000 mPa·s, and more preferably 300 to 100,000 mPa·s. When the viscosity is within such range, the resulting composition will be easy to handle, and the resulting silicone rubber will enjoy excellent physical properties. In the present invention, the viscosity is measured, for example, by a rotary viscometer (BL, BH, BS, etc.).

A preferable example of the component (A) is an organopolysiloxane represented by the average compositional formula (2):

$$R_aSiO_{(4-a)/2} \qquad (2)$$

wherein R is independently a substituted or unsubstituted monovalent hydrocarbon group containing 1 to 12 carbon atoms, preferably 1 to 10 carbon atoms, and more preferably 1 to 8 carbon atoms; a is a positive number in the range of 1.5 to 2.8, preferably 1.8 to 2.5, and more preferably 1.95 to 2.05; with the proviso that 0.001 to 10% by mole, and preferably 0.01 to 5% by mole of all R is an alkenyl group.

Examples of R include those mentioned for the alkenyl group bonded to the silicon atom in the component (A) and those mentioned for the organic group bonded to the silicon atom in the component (A) other than the alkenyl group of the component (A).

Examples of the organopolysiloxane of the component (A) include dimethylsiloxane-methylvinylsiloxane copolymer capped at both ends of the molecular chain with trimethylsiloxy group;
methylvinylpolysiloxane capped at both ends of the molecular chain with trimethylsiloxy group;
dimethylsiloxane-methylvinylsiloxane-methylphenylsiloxane copolymer capped at both ends of the molecular chain with trimethylsiloxy group;
dimethylpolysiloxane capped at both ends of the molecular chain with dimethylvinylsiloxy group;
methylvinylpolysiloxane capped at both ends of the molecular chain with dimethylvinylsiloxy group;
dimethylsiloxane-methylvinylsiloxane copolymer capped at both ends of the molecular chain with dimethylvinylsiloxy group;
dimethylsiloxane-methylvinylsiloxane-methylphenylsiloxane copolymer capped at both ends of the molecular chain with dimethylvinylsiloxy group;
dimethylpolysiloxane capped at both ends of the molecular chain with divinyl methylsiloxy group;
dimethylsiloxane-methylvinylsiloxane copolymer capped at both ends of the molecular chain with divinylmethylsiloxy group;
dimethylpolysiloxane capped at both ends of the molecular chain with trivinylsiloxy group;
dimethylsiloxane-methylvinylsiloxane copolymer capped at both ends of the molecular chain with trivinylsiloxy group;
an organosiloxane copolymer comprising the siloxane unit represented by formula: $R'_3SiO_{0.5}$, the siloxane unit represented by formula: $R'_2R''SiO_{0.5}$, unit represented by formula: $R'_2SiO$, and unit represented by formula: $SiO_2$;
an organosiloxane copolymer comprising the siloxane unit represented by formula: $R'_3SiO_{0.5}$, the siloxane unit represented by formula: $R'_2R''SiO_{0.5}$; and the siloxane unit represented by formula: $SiO_2$;
an organosiloxane copolymer comprising the siloxane unit represented by formula: $R'_2R''SiO_{0.5}$, the siloxane unit represented by formula: $R'_2SiO$, and the siloxane unit represented by formula: $SiO_2$;
an organosiloxane copolymer comprising the siloxane unit represented by formula: $R'R''SiO$, and the siloxane unit represented by formula: $R'R''SiO_{1.5}$, or the siloxane unit represented by formula: $R''SiO_{1.5}$; and
mixtures of two or more of the foregoing organopolysiloxanes.

In the formula, R' is independently a substituted or unsubstituted monovalent hydrocarbon group other than the alkenyl group, and examples include alkyl groups such as methyl group, ethyl group, propyl group, butyl group, pentyl group, hexyl group, cyclohexyl group, and heptyl group; aryl groups such as phenyl group, tolyl group, xylyl group, and naphthyl group; aralkyl group such as benzyl group and phenethyl group; and halogenated alkyl groups such as chloromethyl group, 3-chloropropyl group, and 3,3,3-trifluoropropyl group. R" is an alkenyl group such as vinyl group, allyl group, butenyl group, pentenyl group, hexenyl group, and heptenyl group.

[Component (B)]

The organohydrogenpolysiloxane of the component (B) functions as a crosslinking agent in reacting with the component (A). The organohydrogenpolysiloxane is not limited for its molecular structure, and the conventional polysiloxane having a straight chain, cyclic, branched, three dimentional network (resin), or other structures may be used. The organohydrogenpolysiloxane should have at least 2, and preferably at least 3 hydrogen atoms bonded to silicon atoms (namely, hydrosilyl group represented by SiH) per molecule, while it should not substantially contain a hydroxy group bonded to a silicon atom (namely, silanol group) in the molecule. The organohydrogenpolysiloxane typically contains 2 to 300, preferably 3 to 200, and more preferably 4 to 100 SiH groups. One type or two or more types of organohydrogenpolysiloxane may be used for the component (D). It should be noted that the organohydrogenpolysiloxane of the component (B) does not include the organosilicon compound having an epoxy group as described below [Component (F)].

The organohydrogenpolysiloxane may be the one represented by the following average compositional formula (3):

$$R^2_b H_c SiO_{(4-b-c)/2} \tag{3}$$

In the formula (3), $R^2$ is independently a substituted or unsubstituted monovalent hydrocarbon group bonded to a silicon atom preferably containing 1 to 10 carbon atoms having no aliphatic unsaturated bond. Examples of the substituted or unsubstituted monovalent hydrocarbon group of $R^2$ include alkyl groups such as methyl group, ethyl group, propyl group, isopropyl group, butyl group, isobutyl group, tert-butyl group, pentyl group, neopentyl group, hexyl group, cyclohexyl group, octyl group, nonyl group, and decyl group, aryl groups such as phenyl group, tolyl group, xylyl group, and naphthyl group, aralkyl groups such as benzyl group, phenylethyl group, and phenylpropyl group, and any one of such groups having all or a part of its hydrogen atoms substituted with a halogen atom such as fluorine, bromine, or chlorine, for example, chloromethyl group, chloropropyl group, bromoethyl group, and trifluoropropyl group. The substituted or unsubstituted monovalent hydrocarbon group of $R^2$ is preferably an alkyl group or an aryl group, and more preferably methyl group or phenyl group. Letters b and c are positive numbers wherein b is 0.7 to 2.1, c is 0.001 to 1.0, and b+c is 0.8 to 3.0; and preferably, b is 1.0 to 2.0, c is 0.01 to 1.0, and b+c is 1.5 to 2.5.

The number of SiH groups per molecule is at least 2 (and typically, 2 to 300), preferably at least 3 (for example, 3 to 200), and more preferably 4 to 100, and the SiH groups may be located at either end, at both ends, or in the midst of the molecular chain. The organohydrogenpolysiloxane may have a straight chain, cyclic, branched, or three dimensional network molecular structure, and the number of silicon atoms per molecule (or degree of polymerization) is typically 2 to 300, preferably 3 to 150, and more preferably 4 to 100. The organohydrogenpolysiloxane is liquid at room temperature (25° C.) with the viscosity at 25° C. of typically 0.1 to about 1,000 mPa·s, and preferably 0.5 to about 500 mPa·s. The degree of polymerization may be determined as a number average degree of polymerization (number average molecular weight) or a weight average degree of polymerization (weight average molecular weight) in terms of polystyrene by GPC (gel permeation chromatography) using toluene for the development.

Examples of the organohydrogenpolysiloxane (B) include 1,1,3,3-tetramethyldisiloxane,
1,3,5,7-tetramethylcyclotetrasiloxane,
tris(hydrogendimethylsiloxy)methylsilane,
tris(hydrogendimethylsiloxy)phenylsilane,
methylhydrogencyclopolysiloxane,
methylhydrogensiloxane-dimethylsiloxane cyclic copolymer, methylhydrogenpolysiloxane which is terminated at both ends with trimethylsiloxy group,
dimethylsiloxane-methylhydrogensiloxane copolymer which is terminated at both ends with trimethylsiloxy group,
dimethylsiloxane-methylhydrogensiloxane-methylphenylsiloxane copolymer which is terminated at both ends with trimethylsiloxy group,
dimethylsiloxane-methylhydrogensiloxane-diphenylsiloxane copolymer which is terminated at both ends with trimethylsiloxy group,
methylhydrogenpolysiloxane which is terminated at both ends with dimethylhydrogensiloxy group,
dimethylpolysiloxane which is terminated at both ends with dimethylhydrogensiloxy group,
dimethylsiloxane-methylhydrogensiloxane copolymer which is terminated at both ends with dimethylhydrogensiloxy group,
dimethylsiloxane-methylphenylsiloxane copolymer which is terminated at both ends with dimethylhydrogensiloxy group,
dimethylsiloxane-diphenylsiloxane copolymer which is terminated at both ends with dimethylhydrogensiloxy group,
methylphenylpolysiloxane which is terminated at both ends with dimethylhydrogensiloxy group,
diphenylpolysiloxane which is terminated at both ends with dimethylhydrogensiloxy group,
any one of such compound having a part or all of methyl group substituted with an alkyl group such as ethyl group and propyl group,
organosiloxane copolymer comprising siloxane unit represented by the formula: $R^3_3SiO_{0.5}$, siloxane unit represented by the formula: $R^3_2HSiO_{0.5}$, and siloxane unit represented by the formula: $SiO_2$;
organosiloxane copolymer comprising siloxane unit represented by the formula: $R^3_2HSiO_{0.5}$ and siloxane unit represented by the formula: $SiO_2$;
organosiloxane copolymer comprising siloxane unit represented by the formula: $R^3HSiO$ and siloxane unit represented by the formula: $R^3SiO_{1.5}$ or siloxane unit represented by the formula: $HSiO_{1.5}$; and
a mixture of two or more of such organopolysiloxane. In the above formulae, $R^3$ is a monovalent hydrocarbon group other than alkenyl group and examples are as described above.

The component (B) may be added at an amount such that the hydrogen atom bonded to the silicon atom in the component (B) is at 1 to 10 mole (or groups), and preferably at 1 to 5 mole (or group) in relation to one mole (or group) of the alkenyl group bonded to the silicon atom in the component (A). When the amount of the hydrogen atom bonded to the silicon atom is less than 1 mole in relation to one mole of the alkenyl group bonded to the silicon atom in the component (A), curing of the composition will be insufficient, and the amount in excess of 10 mole will invite markedly reduced heat resistance of the silicone rubber.

[Component (C)]

Component (C) is an addition reaction catalyst. The addition reaction catalyst is not particularly limited as long as it promotes hydrosilylation reaction of the alkenyl group bonded to the silicon atom in the component (A) with the SiH group in the component (B), and one type or two or more types of component (C) may be used.

Examples of the component (C) include platinum group metals such as platinum, palladium, and rhodium; for example, chloroplatinic acid, alcohol-modified chloroplatinic acid, coordination compound of chloroplatinic acid with an olefin, vinylsiloxane, or acetylene compound, tetrakis(triphenylphosphine) palladium, or chrolotris(triphenylphosphine) rhodium. The most preferred are platinum compounds. Component (C) is incorporated at an effective amount of the addition reaction catalyst, and preferably, at amount such that the addition reaction catalyst is at an amount in the range of 1 to 500 ppm, and more preferably 10 to 100 ppm in terms of the weight of the catalyst metal element in relation to the total weight of the components (A) and (B). When incorporated at an amount in such range, the addition reaction is likely to be sufficiently promoted to assure sufficient curing, and since the addition reaction rate increases with the increase in the amount of the catalyst added, the addition of the catalyst in such amount is also economically advantageous.

[Component (D)]

In the present invention, a fine powder silica is used as an optional component (D), and this fine powder silica acts as a reinforcing agent by imparting high tear strength to the composition after curing. Use of the fine powder silica of the component (D) for the reinforcing agent enables formation of a coating film having excellent tear strength.

The fine powder silica of the component (D) has a specific surface area of at least 50 $m^2$/g, preferably 50 to 400 $m^2$/g, and more preferably 100 to 300 $m^2$/g. When the specific surface area is within such range, the resulting cured product is more likely to be imparted with the high tear strength. The specific surface area is measured by BET method.

One type or two or more types of the fine powder silica may be used for the component (D).

The fine powder silica of the component (D) may be any fine powder silica that has been used as a reinforcement filler for a silicone rubber as long as the specific surface area is within such range. Exemplary such fine powder silicas include fumed silica and precipitated silica.

Such fine powder silica may be used with no further treatment. However, the fine powder silica may be used after hydrophobicizing the fine powder silica with a surface treating agent such as an organosilicon compound to provide high fluidity with the composition of the present invention. Exemplary organosilicon compounds include methylchlorosilanes such as trimethylchlorosilane, dimethyldichlorosilane, and methyltrichlorosilane; dimethylpolysiloxanes; and hexaorganodisilazanes such as hexamethyldisilazane, divinyltetramethyldisilazane, and dimethyltetravinyldisilazane. The surface hydrophobicizing may be conducted by mixing one or more types of fine powder silica with one or more types of surface treating agent with optional heating. Alternatively, the surface hydrophobicizing of the fine powder silica may be conducted simultaneously with the preparation of the composition by mixing the components of the composition containing the alkenyl group-containing organopolysiloxane of the component (A) with the fine powder silica preferably in the presence of a small amount of water.

The component (D) may be incorporated at an amount of up to 50 parts by weight (namely at 0 to 50 parts by weight) in relation to 100 parts by weight of the organopolysiloxane of the component (A). When incorporated at an amount in excess of 50 parts by weight, the composition is likely to suffer from loss of fluidity leading to poor workability in the coating. The component (D) is preferably incorporated at 0.1 to 50 parts by weight, more preferably 1 to 50 parts by weight, and most preferably 5 to 40 parts by weight. When incorporated at an amount in such range, the composition of the present invention is more easily imparted with a high tear strength.

[Component (E)]

Component (E) is an organophosphazene compound. When an organophosphazene compound is used in the silicone rubber coating composition for air bag base fabric at a predetermined amount, the resulting liquid silicone rubber coating composition is capable of providing a coated fabric (namely, the base fabric having a coating formed by curing the composition of the present invention (coating layer) formed on at least one surface) having excellent low burning speed defined by FMVSS-302 as well as a cured coating (coating layer) having a low surface tackiness with surprisingly high anti-blocking property. The organophosphazene compound of the component (E) is a compound represented by the following general formula (1):

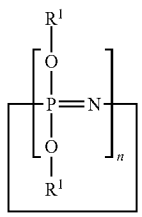

(1)

wherein $R^1$ is independently a substituted or unsubstituted monovalent hydrocarbon group, and n is an integer of 2 to 10, and preferably 3, 4, or 5.

The $R^1$ in the general formula (1) is independently a substituted or unsubstituted monovalent hydrocarbon group, which is preferably a straight chain, branched, or cyclic alkyl group containing 1 to 10, and in particular, 1 to 8 carbon atoms or an aromatic hydrocarbon group (an aryl group or an aralkyl group) containing 6 to 40 carbon atoms optionally having 1 to 4, and in particular, 1 to 2 phenyl groups or phenylene skeletons.

Examples of the $R^1$ include:

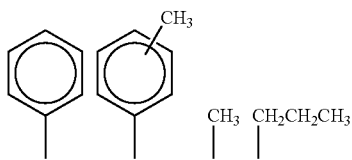

Examples of the organophosphazene compound of the component (E) include:

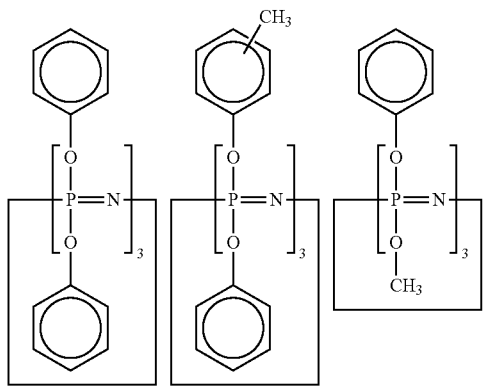

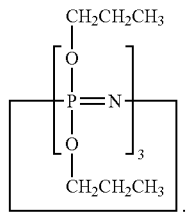

One type or two or more types of the organophosphazene compound may be used for the component (E).

Component (E) may be incorporated at an amount of 0.1 to 10 parts by weight, and preferably 0.25 to 5 parts by weight in relation to 100 parts by weight of the organopolysiloxane (component (A)). When incorporated at an amount of less than 0.1 part by weight, the resulting composition may not be provided with the low burning speed or the low surface tackiness. When incorporated at an amount in excess of 10 parts by weight, no substantial improvement in the burning speed and the surface tackiness of the resulting composition is realized by increasing the amount of the addition and such incorporation is rather uneconomical due to the increased cost.

[Component (F)]

Component (F) is an organosilicon compound having an epoxy group and an alkoxy group bonded to a silicon atom in the molecule, and the organosilicon compound is not particularly limited as long as it has the epoxy group and the alkoxy group bonded to the silicon atom in one molecule. However, in view of realizing high adhesion property, the organosilicon compound is preferably the one having at least 1 epoxy group and at least 2 alkoxy groups (for example, trialkoxysilyl group or organodialkoxysilyl group) bonded to silicon atoms, for example, an organosilane or a cyclic or straight chain organosiloxane containing 2 to 30, and preferably 4 to 20 silicon atoms which has at least 1 epoxy group and at least 2 alkoxy groups bonded to silicon atoms. The component (F) may comprise one or two or more organosilicon compounds.

Preferably, the epoxy group is bonded to the silicon atom as a glycidoxyalkyl group such as glycidoxypropyl group or an epoxy-containing cyclohexylalkyl group such as 2,3-epoxycyclohexylethyl group or 3,4-epoxycyclohexylethyl group. By bonding to the silicon atom, the alkoxy group bonded to the silicon atom preferably forms a trialkoxysilyl group such as trimethoxysilyl group, or triethoxysilyl group; or an alkyldialkoxysilyl group such as methyldimethoxysilyl group, ethyl dimethoxysilyl group, methyldiethoxysilyl group, or ethyldiethoxysilyl group.

The component (F) may optionally have a functional group other than the epoxy group and the alkoxy group bonded to the silicon atom in the same molecule, and the functional group may be at least one functional group selected from the group consisting of an alkenyl group such as vinyl group, acryl group, (meth)acryloxy group, and hydrosilyl group (SiH group).

Examples of the organosilicon compound of the component (F) include epoxyfunctional group-containing silane coupling agents (namely, epoxyfunctional group-containing organoalkoxysilanes) such as
γ-glycidoxypropyltrimethoxysilane,
γ-glycidoxypropyltriethoxysilane,
γ-glycidoxypropylmethyldimethoxysilane,
γ-glycidoxypropylmethyldiethoxysilane,
(3,4-epoxycyclohexylethyl)trimethoxysilane,
(3,4-epoxycyclohexylethyl)triethoxysilane,
(3,4-epoxycyclohexylethyl)methyldimethoxysilane, (3,4-epoxycyclohexylethyl)methyldiethoxysilane,
(2,3-epoxycyclohexylethyl)trimethoxysilane,
(2,3-epoxycyclohexylethyl)triethoxysilane,
(2,3-epoxycyclohexylethyl)methyldimethoxysilane, and
(2,3-epoxycyclohexylethyl)methyldiethoxysilane;
organosilicon compounds such as organosilanes and organopolysiloxanes represented by the following chemical formulae:

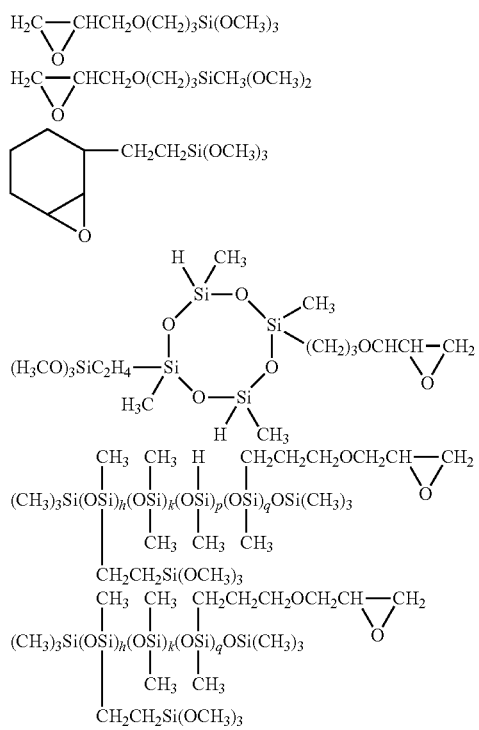

(wherein h is an integer of 1 to 10, k is an integer of 0 to 100, and preferably 0 to 20, p is an integer of 1 to 100, and preferably 1 to 20, and q is an integer of 1 to 10); a mixture of two or more such compounds; and a partial hydrolytic condensate of such composition or two ore more such compositions.

Component (F) may be incorporated at an amount of 0.1 to 10 parts by weight, and preferably 0.25 to 5 parts by weight in relation to 100 parts by weight of the organopolysiloxane (component (A)). When incorporated at an amount of less than 0.1 part by weight, the resulting composition may suffer from insufficient adhesion. When incorporated at an amount in excess of 10 parts by weight, no substantial improvement in the adhesion capability of the resulting composition is realized by increasing the amount of the addition and such incorporation is rather uneconomical due to the increased cost. When the component (F) contains an alkenyl group and/or SiH group, the component (F) may be incorporated at an amount such that 1 to 10 mole (or groups), preferably 1 to 8 mole (or groups), and more preferably 1 to 6 moles (or groups) of the hydrogen atom bonded to the silicon atom in the components (B) and (F) would be present per mole or per one group of the alkenyl group bonded to the silicon atom in the components (A) and (F). When the hydrogen atom bonded to the silicon atom in the component (B) and (F) is less than 1 mole in relation to 1 mole of the alkenyl group bonded to the silicon atom in the components (A) and (F), curing of the resulting composition will be insufficient and adhesion will be insufficient. On the other hand, when the hydrogen atom bonded to the silicon atom in the component (B) and (F) is in excess of 10 mole in relation to 1 mole of the alkenyl group bonded to the silicon atom in the components (A) and (F), heat resistance of the resulting silicone rubber will be extremely poor, and this leads to difficulty in improving the adhesion and economically disadvantageous high cost.

[Component (G)]

Component (G) may comprise one or both of a titanium compound (and more specifically, an organotitanium compound) and a zirconium compound (and more specifically, an organozirconium compound), and the component (G) acts as a condensation co-catalyst for promoting the adhesion. The component (G) may comprise either one compound or two or more compounds.

Examples of the component (G) include titanium condensation co-catalysts (titanium compounds) such as organotitatnates such as titanium tetraisopropoxide, titanium tetra-n-butoxide, and titanium tetra-2-ethylhexoxide; organotitanium chelate compounds such as titanium diisopropoxy bis(acetyl acetonate), titanium diisopropoxy bis(ethyl acetoacetate), and titanium tetraacetyl acetonate; as well as zirconium condensation co-catalysts (zirconium compounds) such as organozirconium ester such as zirconium tetra-n-propoxide and zirconium tetra-n-butoxide; organozirconium chelate compounds such as zirconium tributoxymonoacetyl acetonate, zirconium monobutoxyacetyl acetonate bis(ethyl acetoacetate), and zirconium tetraacetyl acetonate.

The component (G) may be incorporated at an amount of 0.1 to 5 parts by weight, and more preferably at 0.2 to 2 parts by weight per 100 parts by weight of the component (A). When incorporated at less than 0.1 parts by weight, the cured product is likely to suffer from poor ability of retaining the adhesion under high temperature and high humidity conditions. Incorporation in excess of 5 parts by weight may result in the loss of the heat resistance of the cured product.

[Other Components]

The composition of the present invention may also contain other components in addition to the components (A) to (G) as described above to the extent that the merits of the present invention are not adversely affected. Exemplary such optional components include those as described below which may be used alone or in combination of two or more.

Reaction Regulator

The reaction regulator is not particularly limited as long it is a compound capable of suppressing the curing by the addition reaction catalyst (the component (C)), and any reaction regulator that has been known in the art may be used. Exemplary such reaction regulators include phosphorus-containing compounds such as triphenylphosphine; nitrogen-containing compounds such as tributylamine, tetramethylethylenediamine, and benzotriazole; sulfur-containing compounds; acetylene compounds such as acetylene alcohol; compounds containing two or more alkenyl groups; hydroperoxy compounds; and maleic acid derivatives.

Since the degree of the curing suppression attained by the reaction regulator varies by the chemical structures of the reaction regulator, the amount of the reaction regulator added is preferably adjusted for each type of the reaction regulator used. When the reaction regulator is added at an adequate amount, the composition will enjoy long term storage stability at room temperature without detracting from the curability.

Inorganic Filler

Examples of the inorganic filler include inorganic fillers such as crystalline silica, hollow filler, silsesquioxane, fumed titanium dioxide, magnesium oxide, zinc oxide, iron oxide, aluminum hydroxide, magnesium carbonate, calcium carbonate, zinc carbonate, laminar mica, carbon black, diatomaceous earth, and glass fiber; fillers obtained by hydrophobicizing such inorganic fillers by surface treatment with an organosilicon compound such as an organoalkoxysilane compound, organochlorosilane compound, organosilazane compound, or low molecular weight siloxane compound; silicone rubber powder; and silicone resin powder.

Other Components

Exemplary such other components include organopolysiloxane having only one hydrogen atom bonded to a silicon atom per molecule and not containing other functional groups; organopolysiloxane having only one alkenyl group bonded to a silicon atom per molecule and not containing other functional groups; non-functional organopolysiloxane having no alkenyl group bonded to a silicon atom, no hydrogen atom bonded to a silicon atom and no other functional groups; organic solvent, anti-creep-hardening agent, plasticizer, thixotropic agent, pigment, dye, and antimold.

[Production Method]

The liquid silicone rubber coating composition of the present invention may be prepared by mixing the components as described above by the method commonly used in the art. The composition may have a viscosity at 25° C. of typically about 10 to 500 Pa·s, and preferably about 20 to 200 Pa·s.

<Airbag>

The liquid silicone rubber coating composition prepared by such method is highly adhesive to the base fabric for airbag, and therefore, this liquid silicone rubber coating composition is well adapted for use in forming a curtain airbag which is to be accommodated along the A-pillar to the roof side, and whose inflated state should be maintained for a certain period for the protection of the passenger's head or prevention of the passenger from being thrown out of the vehicle upon collision or roll-over of the vehicle.

In the present invention, the airbag, and in particular, the curtain airbag on which the silicone rubber coating layer is formed by coating and curing the composition may be the one having a known structure. Exemplary such airbags include those prepared by using a woven fabric of 6,6-nylon, 6-nylon, polyester fiber, alamid fiber, polyamide fiber, polyester fiber, or other synthetic fiber for the base fabric having the surface corresponding to the interior of the airbag coated with the rubber. More specifically, the air bag may be an air bag prepared by placing two plain-woven fabrics one on another, adhering the fabrics by the adhesive applied along the periphery of the fabric, and sewing the fabrics together along the periphery where the adhesive has been applied; or the airbag of woven fabric formed by double weaving having the pouch structure formed by double weaving.

[Production Method]

The layer of the liquid silicone rubber coating composition may be formed by coating the liquid silicone rubber coating composition on at least one surface, and typically on one surface of a substrate comprising a fabric cloth, and curing the coating by placing in a hot air oven to thereby form the silicone rubber coating layer. A curtain airbag may be produced by using the thus produced silicone rubber-coated base fabric for a curtain airbag.

Examples of the substrate comprising the fabric cloth include the substrate comprising a woven base fabric of synthetic fiber, and the substrate may be coated with the composition by the method commonly used in the art to a thickness of (or a coating weight) of preferably about 5 to 150 g/m², more preferably about 10 to 80 g/m², and most preferably about 15 to 60 g/m².

The liquid silicone rubber coating composition of the present invention may be cured by a curing method known in the art under the conditions known in the art. For example, the liquid silicone rubber coating composition may be cured by heating the composition to 120 to 180° C. for 1 to 10 minutes.

EXAMPLES

Next, the present invention is described in further detail by referring to Examples and Comparative Examples, which by no means limit the scope of the invention. In the following description, the viscosity was measured by a rotary viscometer.

Example 1

65 parts by weight of dimethylpolysiloxane having both ends of the molecular chain capped with vinyl dimethylsiloxy group and having a viscosity at 25° C. of about 30,000 mPa·s, 8 parts by weight of hexamethyldisilazane, 2 parts by weight of water, and 40 parts by weight of fumed silica (Aerosil™ 300 manufactured by Nippon Aerosil Co., Ltd.) having a specific surface area measured by BET method of about 300 m²/g were charged in a kneader at room temperature, and kneaded for 1 hour. The resulting mixture was heated to 150° C., and kneaded for another 2 hours. The mixture was cooled to room temperature, and to this mixture were added 19 parts by weight of dimethylpolysiloxane having both ends of the molecular chain capped with vinyldimethylsiloxy group and having a viscosity at 25° C. of about 30,000 mPa·s and 5 parts by weight of dimethylpolysiloxane containing 5% by mole of vinylmethylsiloxane unit and 95% by mole of dimethylsiloxane unit in relation to all diorganosiloxane units (difunctional siloxane unit) in the backbone, and having both ends of the molecular chain capped with trimethylsiloxy group, and having a viscosity at 25° C. of about 700 mPa·s. The mixture was kneaded until the mixture was homogeneous to produce base compound (I).

78 parts by weight of the thus produced base compound (I) was mixed with 35 parts by weight of dimethylpolysiloxane having both ends of the molecular chain capped with vinyldimethylsiloxy group and having a viscosity at 25° C. of about 5,000 mPa·s; 15 parts by weight of dimethylpolysiloxane having both ends of the molecular chain capped with vinyldimethylsiloxy group and having a viscosity at 25° C. of about 1,000 mPa·s; 10 parts by weight of organopolysiloxane resin having a three-dimensional network structure comprising 39.5% by mole of $(CH_3)_3SiO_{1/2}$ unit, 6.5% by mole of $(CH_3)_2(CH_2=CH)SiO_{1/2}$ unit, and 54% by mole of $SiO_2$ unit; 6.4 parts by weight of dimethylsiloxane-methylhydrogensiloxane copolymer capped at both ends of the molecular chain with trimethylsiloxy group and having the hydrogen atom bonded to the silicon atom in the side chain (having a content of the hydrogen atoms bonded to the silicon atoms of 1.08% by weight) and having a viscosity at 25° C. of 45 mPa·s; 0.5 part by weight of an organophosphazene compound represented by the following formula (4):

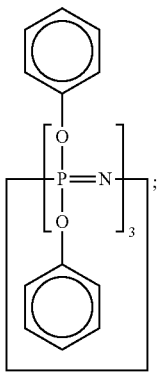

(4)

0.09 part by weight of 1-ethynylcyclohexanol; 0.38 part by weight of dimethylpolysiloxane solution containing 1% by weight of chloroplatinic acid-1,3-divinyltetramethyldisiloxane complex in terms of platinum atom content; 0.3 part by weight of γ-glycidoxypropyltrimethoxysilane; and 0.2 part by weight of titanium tetra-2-ethylhexoxide to produce composition A (having a molar ratio of the SiH group in the component (B) to the vinyl group bonded to the silicon atom in the component (A) (which is hereinafter referred to as the SiH/SiVi) of 5).

The resulting composition A was evaluated by the following tests (measurement of hardness, elongation at break, tensile strength, tear strength, and peel adhesion and Scot crease-flex test).

[Hardness, Elongation at Break, Tensile Strength, and Tear Strength]

Composition A was cured by pressing at 150° C. for 5 minutes, and then subjected to post-curing at 150° C. for 1 hour to produce a sheet defined in JIS K 6249, and this sheet was evaluated for hardness, elongation at break, tensile strength, and tear strength according to the procedure defined in JIS K 6249. The results are shown in Table 1.

[Scot Crease-Flex Test]

Scot crease-flex test was conducted by using a Scot crease-flex tester. The silicone rubber-coated base fabric was crumpled for 500 cycles while pressing at a pressure of 5 kgf, and the coating was visually inspected. In the test, the coated base fabric was evaluated "pass" when the silicone rubber coating layer was not peeled off the coating surface of the base fabric, and "fail" in the case of the peeled coating. The results are shown in Table 1.

[Measurement of Flammability]

Flammability of the silicone rubber-coated nylon base fabric was measured by the procedure defined in FMVSS-302. The flame burning speed defined by the FMVSS-302 is preferably up to 50 mm/min. The results are shown in Table 1.

[Measurement of Surface Tackiness]

The test was conducted to evaluate tackiness (blocking) of the surface of the rubber coating layer. A fabric having a rubber coating layer having a dry thickness of 0.2 mm formed on one surface (a rubber-coated fabric) was cut to a size of 100 mm (width)×200 mm (length), and the rubber-coated fabric was attached to the glass plate with the rubber-coated surface in contact with the glass plate with no air entrainment. This glass plate having the rubber-coated fabric attached was placed upright to measure the time until the rubber-coated fabric peeled off the glass plate to thereby evaluate the tackiness according to the following criteria. The evaluation was "A (excellent)" when the time between the placement of the glass plate and falling of the rubber-coated fabric from the glass plate was less than 3 seconds; "B (good)" when the time was 3 seconds or longer and shorter than 10 seconds; "C (fail)" when the time was 10 seconds or longer. The results are shown in Table 1.

Example 2

78 parts by weight of the base compound (I) produced in Example 1 was mixed with 35 parts by weight of dimethylpolysiloxane having both ends of the molecular chain capped with vinyldimethylsiloxy group and having a viscosity at 25° C. of about 5,000 mPa·s; 15 parts by weight of dimethylpolysiloxane having both ends of the molecular chain capped with vinyldimethylsiloxy group and having a viscosity at 25° C. of about 1,000 mPa·s; 10 parts by weight of organopolysiloxane resin having a three-dimensional network structure comprising 39.5% by mole of $(CH_2)_3SiO_{1/2}$ unit, 6.5% by mole of $(CH_3)_2(CH_2=CH)SiO_{1/2}$ unit, and 54% by mole of $SiO_2$ unit; 6.4 parts by weight of dimethylsiloxane-methylhydrogensiloxane copolymer capped at both ends of the molecular chain with trimethylsiloxy group and having the hydrogen atom bonded to the silicon atom in the side chain (having a content of the hydrogen atoms bonded to the silicon atom of 1.08% by weight) and having a viscosity at 25° C. of 45 mPa·s; 0.5 part by weight of an organophosphazene compound represented by the following formula (5):

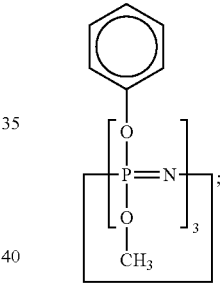

(5)

0.09 part by weight of 1-ethynylcyclohexanol; 0.38 part by weight of dimethylpolysiloxane solution containing 1% by weight of chloroplatinic acid-1,3-divinyltetramethyldisiloxane complex in terms of platinum atom content; 0.3 part by weight of γ-glycidoxypropyltrimethoxysilane; and 0.2 part by weight of titanium tetra-2-ethylhexoxide to produce composition B having a SiH/SiVi of 5.

Composition B was cured, and the cured product was measured for the hardness, elongation at break, tensile strength, and tear strength, and Scot crease-flex test, flammability test, and surface tackiness test were also conducted by repeating the procedure of Example 1. The results are shown in Table 1.

Comparative Example 1

78 parts by weight of the base compound (I) produced in Example 1 was mixed with 35 parts by weight of dimethylpolysiloxane having both ends of the molecular chain capped with vinyldimethylsiloxy group and having a viscosity at 25° C. of about 5,000 mPa·s; 15 parts by weight of dimethylpolysiloxane having both ends of the molecular chain capped with vinyldimethylsiloxy group and having a viscosity at 25° C. of about 1,000 mPa·s; 10 parts by weight of organopolysiloxane resin having a three-dimensional network structure comprising 39.5% by mole of $(CH_3)_3SiO_{1/2}$ unit, 6.5% by mole of (CH$_3$)$_2$(CH$_2$=CH)SiO$_{1/2}$ unit, and 54% by mole of SiO$_2$ unit; 6.4 parts by weight of dimethylsiloxane-methylhydrogensiloxane copolymer capped at both ends of the molecular chain with trimethylsiloxy group and having the hydrogen atom bonded to the silicon atom in the side chain (having a content of the hydrogen atoms bonded to the silicon atom of 1.08% by weight) and having a viscosity at 25° C. of 45 mPa·s; 0.05 part by weight of the organophosphazene compound represented by the formula (4) (corresponding to 0.053 part by weight per 100 parts by weight of the component (A); 0.09 part by weight of 1-ethynylcyclohexanol; 0.38 part by weight of dimethylpolysiloxane solution containing 1% by weight of chloroplatinic acid-1,3-divinyltetramethyldisiloxane complex in terms of platinum atom content; 0.3 part by weight of γ-glycidoxypropyltrimethoxysilane; and 0.2 part by weight of titanium tetra-2-ethylhexoxide to produce composition C having a SiH/SiVi) of 5.

Composition C was cured, and the cured product was measured for the hardness, elongation at break, tensile strength, and tear strength, and Scot crease-flex test, flammability test, and surface tackiness test were also conducted by repeating the procedure of Example 1. The results are shown in Table 1.

Comparative Example 2

The components of Example 1 except for the 0.5 part by weight of the organophosphazene compound represented by the formula (4) were mixed to prepare composition D. The hardness, elongation at break, tensile strength, and tear strength were measured, and Scot crease-flex test, flammability test, and surface tackiness test were conducted by repeating the procedure of Example 1. The results are shown in Table 1.

TABLE 1

|  | Example | | Comparative Example | |
|---|---|---|---|---|
|  | 1 | 2 | 1 | 2 |
| Composition | A | B | C | D |
| Durometer hardness (type A) | 46 | 46 | 47 | 46 |
| Elongation at break (%) | 340 | 330 | 330 | 330 |
| Tensile strength (MPa) | 5.7 | 5.6 | 5.5 | 5.3 |
| Tear strength (kN/m) | 21 | 20 | 20 | 19 |
| Scot crease-flex test | Pass | Pass | Pass | Pass |
| Flammability test (mm/min) | 30 | 30 | 60 | 80 |
| Surface tackiness test | A | A | B | C |

Japanese Patent Application No. 2011-229390 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A liquid silicone rubber coating composition comprising
  (A) 100 parts by weight of an organopolysiloxane having at least 2 alkenyl groups bonded to silicon atoms per molecule;
  (B) an organohydrogenpolysiloxane having at least 2 hydrogen atoms bonded to silicon atoms per molecule, at an amount such that 1 to 10 hydrogen atoms bonded to silicon atoms in the component (B) are present in relation to one alkenyl group bonded to the silicon atom in the component (A);
  (C) an effective amount of an addition reaction catalyst;
  (D) 0 to 50 parts by weight of a fine powder silica having a specific surface area of at least 50 m$^2$/g;
  (E) 0.1 to 10 parts by weight of an organic compound represented by the following general formula (1):

wherein R$^1$ is independently a substituted or unsubstituted monovalent hydrocarbon group and n is an integer of 2 to 10;
  (F) 0.1 to 10 parts by weight of an organosilicon compound having an epoxy group and an alkoxy group bonded to a silicon atom in the molecule; and
  (G) 0.1 to 5 parts by weight of at least one member selected from titanium compounds and zirconium compounds.

2. The liquid silicone rubber coating composition according to claim 1 wherein R$^1$ in the formula (1) of the component (E) is a straight chain, branched, or cyclic alkyl group containing 1 to 20 carbon atoms or a monovalent aromatic hydrocarbon group containing 6 to 40 carbon atoms having 1 to 4 phenyl groups or phenylene skeletons.

3. The liquid silicone rubber coating composition according to claim 1 wherein the component (G) is an organotitanium compound.

4. The liquid silicone rubber coating composition according to claim 3 wherein the organotitanium compound of the component (G) is an organotitanate, an organotitanium chelate compound, or a combination thereof.

5. The liquid silicone rubber coating composition according to claim 1 wherein the component (G) is an organozirconium compound.

6. The liquid silicone rubber coating composition according to claim 5 wherein the organozirconium compound of the component (G) is an organozirconium ester, an organozirconium chelate compound, or a combination thereof.

7. The liquid silicone rubber coating composition according to claim 1 wherein the composition is the one for producing a curtain airbag.

8. A method for producing a curtain airbag comprising the steps of coating a liquid silicone rubber coating composition comprising
  (A) 100 parts by weight of an organopolysiloxane having at least 2 alkenyl groups bonded to silicon atoms per molecule;
  (B) an organohydrogenpolysiloxane having at least 2 hydrogen atoms bonded to silicon atoms per molecule, at an amount such that 1 to 10 hydrogen atoms bonded to silicon atoms in the component (B) are present in relation to one alkenyl group bonded to the silicon atom in the component (A);
  (C) an effective amount of an addition reaction catalyst;
  (D) 0 to 50 parts by weight of a fine powder silica having a specific surface area of at least 50 m$^2$/g;
  (E) 0.1 to 10 parts by weight of an organic compound represented by the following general formula (1):

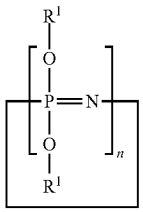

(1)

wherein $R^1$ is independently a substituted or unsubstituted monovalent hydrocarbon group and n is an integer of 2 to 10;

(F) 0.1 to 10 parts by weight of an organosilicon compound having an epoxy group and an alkoxy group bonded to a silicon atom in the molecule; and (G) 0.1 to 5 parts by weight of at least one member selected from titanium compounds and zirconium compounds on at least one surface of a substrate comprising a fiber cloth, and curing the coating composition to form a silicone rubber coating layer composed of the cured product of the coating composition on the at least one surface of the substrate.

9. A curtain airbag comprising a substrate comprising a fiber fabric and a silicone rubber coating layer formed by coating and curing a liquid silicone rubber coating composition comprising (A) 100 parts by weight of an organopolysiloxane having at least 2 alkenyl groups bonded to silicon atoms per molecule;

(B) an organohydrogenpolysiloxane having at least 2 hydrogen atoms bonded to silicon atoms per molecule, at an amount such that 1 to 10 hydrogen atoms bonded to silicon atoms in the component (B) are present in relation to one alkenyl group bonded to the silicon atom in the component (A);

(C) an effective amount of an addition reaction catalyst;

(D) 0 to 50 parts by weight of a fine powder silica having a specific surface area of at least 50 $m^2/g$;

(E) 0.1 to 10 parts by weight of an organic compound represented by the following general formula (1):

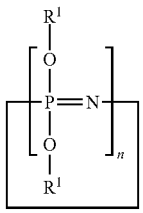

(1)

wherein $R^1$ is independently a substituted or unsubstituted monovalent hydrocarbon group and n is an integer of 2 to 10;

(F) 0.1 to 10 parts by weight of an organosilicon compound having an epoxy group and an alkoxy group bonded to a silicon atom in the molecule; and (G) 0.1 to 5 parts by weight of at least one member selected from titanium compounds and zirconium compounds on at least one surface of the substrate.

10. The liquid silicone rubber coating composition according to claim 1, wherein, in component (E), one $R^1$ is phenyl, the other $R^1$ is phenyl or methyl, and n is 3, and wherein component (G) is titanium tetra-2-ethylhexoxide.

* * * * *